(12) United States Patent
Arosio

(10) Patent No.: US 7,007,983 B2
(45) Date of Patent: Mar. 7, 2006

(54) QUICK CONNECT COUPLING

(75) Inventor: Massimo Arosio, Treviglio (IT)

(73) Assignee: Faster S.p.A., Rivolta d'Adda (IT)

( * ) Notice: Subject to any disclaimer, the term of this patent is extended or adjusted under 35 U.S.C. 154(b) by 72 days.

(21) Appl. No.: 10/737,005

(22) Filed: Dec. 15, 2003

(65) Prior Publication Data

US 2004/0124634 A1    Jul. 1, 2004

(30) Foreign Application Priority Data

Dec. 20, 2002   (IT)   ........................... MI2002A2716

(51) Int. Cl.
*F16L 37/18*   (2006.01)

(52) U.S. Cl. .................. 285/316; 285/276; 285/924; 137/614.05

(58) Field of Classification Search ............... 285/13, 285/14, 85, 86, 308, 276, 924, 316; 137/614.05
See application file for complete search history.

(56) References Cited

U.S. PATENT DOCUMENTS

| | | | | | |
|---|---|---|---|---|---|
| 4,077,433 | A | * | 3/1978 | Maldavs | 137/614.04 |
| 4,437,647 | A | * | 3/1984 | Cruse | 285/924 |
| 4,552,333 | A | * | 11/1985 | Niemi | 285/924 |
| 4,598,896 | A | * | 7/1986 | Maldavs | 285/924 |
| 5,285,853 | A | * | 2/1994 | Eckert et al. | 166/382 |
| 5,413,309 | A | * | 5/1995 | Giesler | 285/924 |
| 5,535,985 | A | * | 7/1996 | Larbuisson | 285/924 |
| 5,937,899 | A | * | 8/1999 | Zeiber | 285/924 |
| 6,588,806 | B1 | * | 7/2003 | Arosio | 285/306 |
| 6,830,070 | B1 | * | 12/2004 | Mikiya et al. | 137/614.05 |

* cited by examiner

*Primary Examiner*—Aaron Dunwoody
(74) *Attorney, Agent, or Firm*—Kirschstein, et al.

(57) ABSTRACT

An annular gasket is stationarily mounted on one coupler, and a tubular body is mounted for axial sliding movement within another coupler. The body has an outer wall formed with a sealing surface that sealingly engages the gasket in a sealed position, and with an outer channel that is spaced from the gasket in a bleed position in which pressurized fluid within the couplers is released to a bleed fitting.

6 Claims, 7 Drawing Sheets

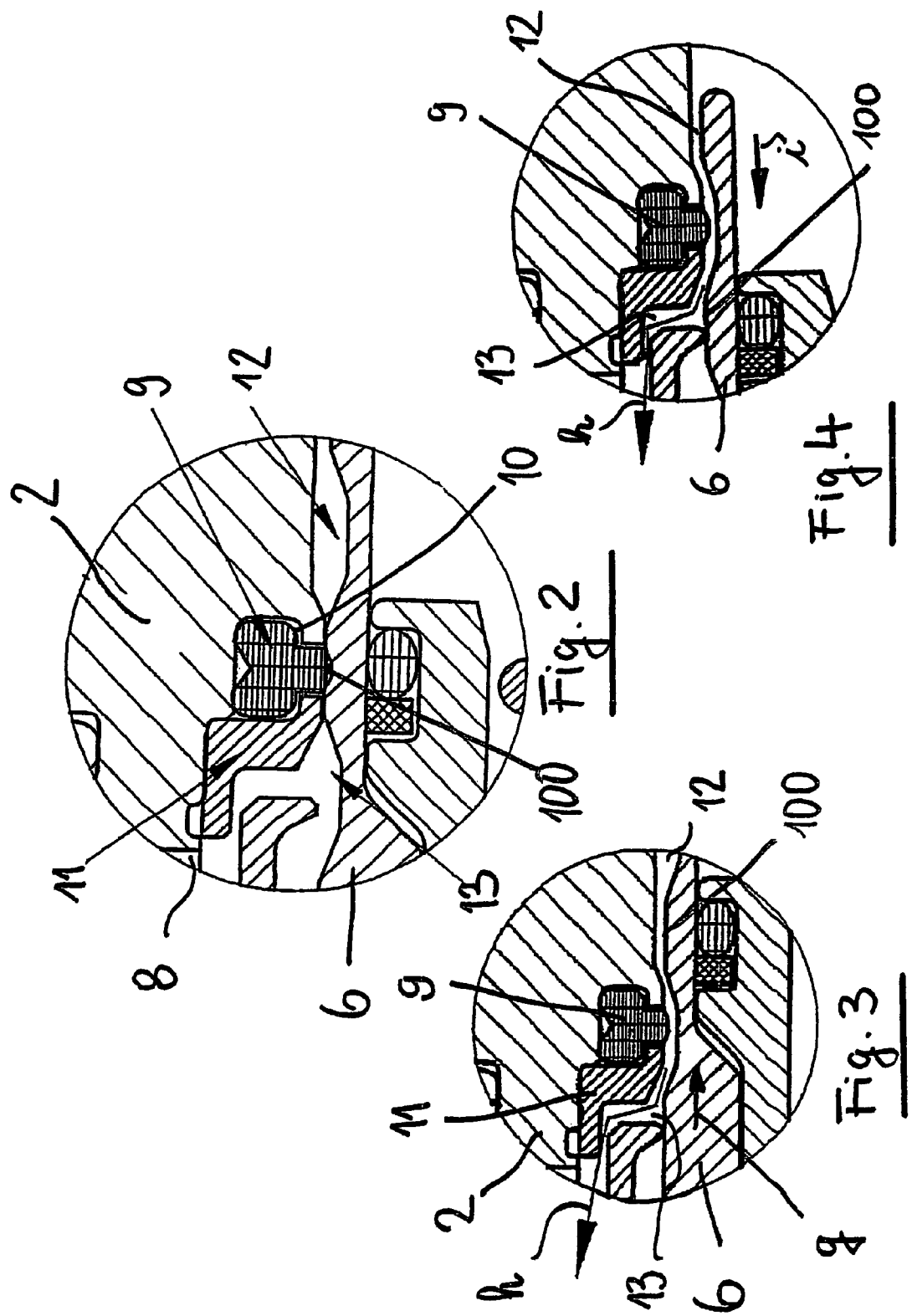

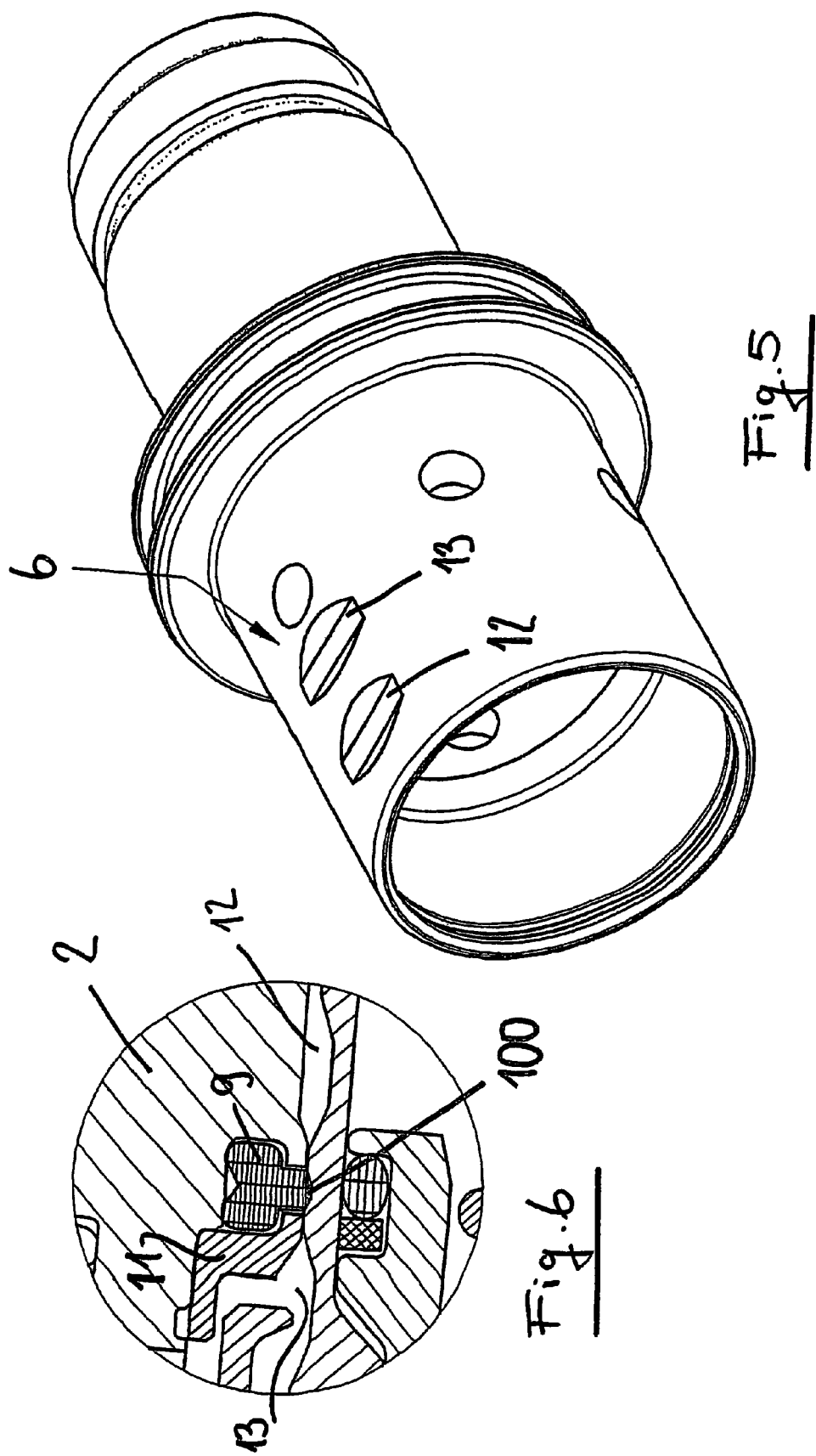

QUICK CONNECT COUPLING

BACKGROUND OF THE INVENTION

The present invention relates to a quick coupling with a connecting, respectively a releasing, capability in the presence of a pressurized hydraulic fluid.

Quick couplings or fittings, in particular of a so-called "push-pull" type for coupling resilient pipes conveying a pressurized fluid are already commercially available.

Said fittings comprise a tubular element and a rod like-element, which can be coupled to one another under a pushing force, or can be disengaged from one another by applying on the fitting elements a pulling force.

In a particular advantageous manner, the above mentioned connecting and releasing operations can be also carried out as pressurized fluid are present in the pipes and in the quick coupling constructional elements.

To perform the mentioned connecting and releasing operations as a high pressure is present in said pipes or hydraulic devices, the coupling tubular element comprises in inner bleeding means allowing to drain a comparatively high fluid amount, to reduce or release the pressure in said quick tubular coupling, thereby facilitating the connecting and releasing operations.

In prior quick couplings, the hydraulic fluid draining or bleeding is performed by complex bleeding valves arranged in the tubular element, which bleeding valves, in particular, comprise sealing means, valve seats and urging springs urging the valve stems of rods toward a closure position thereof.

Thus, in assembling the quick coupling elements, the bleeding valves are urged by a pushing force, to be disengaged from their seats, for allowing the pressurized hydraulic fluid to partially flow.

However, as it should be apparent, the provision of a bleeding valve would allow a coupling or releasing operation to occur also when the quick coupling is subjected to hydraulic pressure; accordingly, in this case, the quick coupling would have a very complex construction including a plurality of mechanical elements to form said bleeding valve to be installed in the coupling body, which bleeding valve, moreover, will occupy a comparatively large space and, consequently, also the quick coupling will disadvantageously have a large size.

SUMMARY OF THE INVENTION

Accordingly, the aim of the present invention is to provide a quick coupling the tubular element and a rod element of which can be easily and safely coupled and released under pressure, while omitting complex bleeding valves and achieving this object by a simple modification of the conventional components of the quick coupling, in particular of a push-pull type.

According to one aspect of the present invention, the above aim is achieved by a quick coupling with a connecting, respectively releasing, capability in the presence of a pressurized hydraulic fluid, characterized in that said quick coupling comprises a tubular body slidably supported inside a tubular element and having a circumferential and continuous sealing surface, cooperating with an annular gasket and that, near the sealing surface of said slidable body, at least a hydraulic fluid outlet channel coupled with a bleeding fitting is provided.

BRIEF DESCRIPTION OF THE DRAWINGS

The subject matter of the present invention will be disclosed in a more detailed manner hereinafter, with reference to the accompanying drawings, where:

FIG. 2 shows the detail (X) of FIG. 1 in a perfectly sealed condition;

FIG. 3 shows a detail of a constructional element urged toward the inner portion of the tubular element, thereby clearing a fluid draining channel;

FIG. 4 shows a detail of the tubular element being withdrawn, thereby clearing, also in this case, a fluid draining channel;

FIG. 5 shows, in perspective, the rear end portion of the tubular element;

FIG. 6 shows, by a cross sectional view, a portion of the tubular element and of the gasket in a sealing condition thereof;

DESCRIPTION OF THE PREFERRED EMBODIMENT

Figure 1:
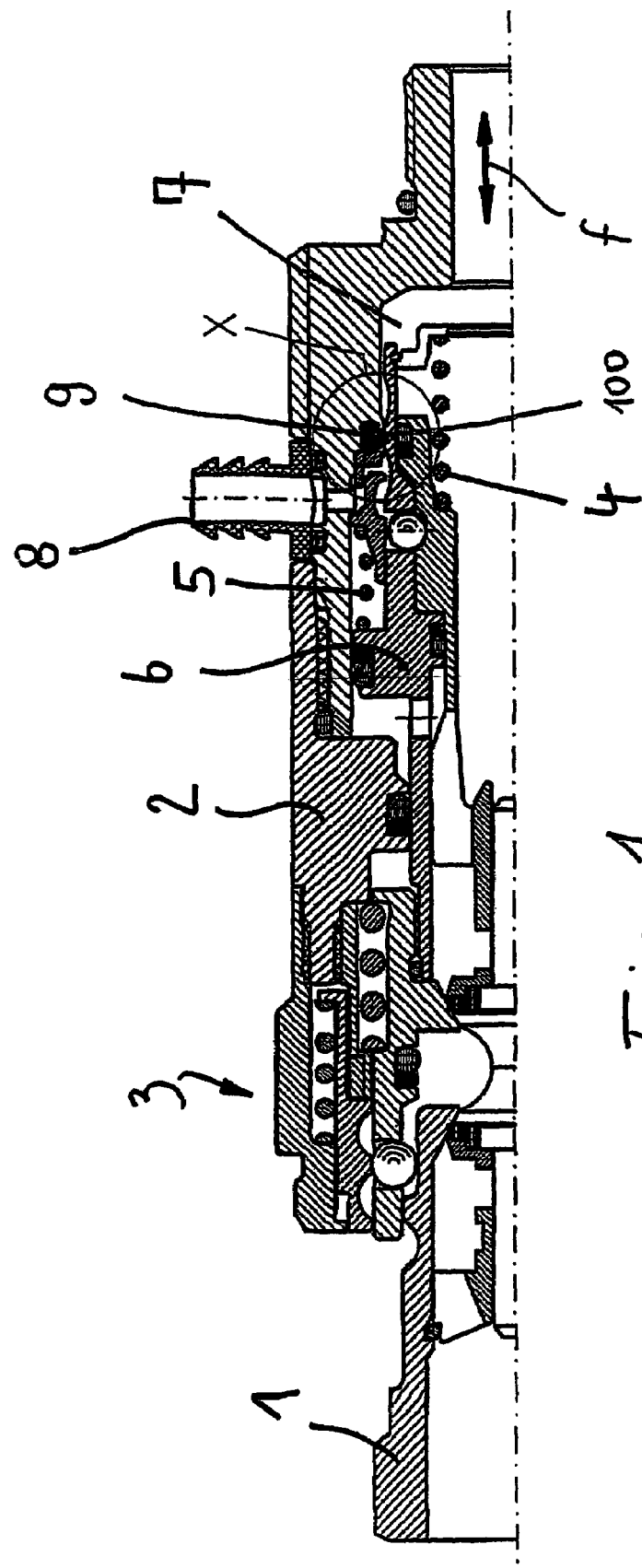
FIG. 1 shows a half of a quick coupling comprising a tubular device and a rod device, during the assembling thereof.

FIG. 1 shows a half of a rod-like element 1 as it is introduced into a tubular element 2 of a prior quick coupling, generally indicated by 3.

The hydraulic fluid is axially conveyed, under a high pressure, through the coupling 3, as schematically indicated by the arrow (f).

In said tubular element 2 a tubular body, generally indicated by 6 of a type known in the prior art and counterbiassed by urging springs 4 and 5 is slidably supported.

Because of the hydraulic fluid present herein, high pressures are generated in the zone 7 of the tubular element 2.

To prevent the hydraulic fluid from undesirably and uncontrollably exiting a conventional bleeding fitting 8, in this region an annular gasket 9 tightly bearing on the outer mantle 100 of the tubular element 6 is provided, said tubular element 6 being adapted to slide against an urging spring 200.

The gasket 9, as clearly shown in FIG. 2, is housed in a recess 10, formed on the inner circumference of the tubular element.

To hold said annular gasket 9 at its proper working position, and to prevent any variable hydraulic pressure from displacing said gasket 9 or disengaging it from the tubular element 2, a locking ring 11 mounted at a fixed position inside the tubular element 2 is provided.

Between the outer perimeter of the body 6 and said tubular element 2, a circumferential channel, generally indicated by 12, is moreover provided.

At a mirror-like position from the channel 12, a further channel 13 is arranged, both said channels 12, 13 extending toward the bleeding fitting 8.

FIG. 3 generally shows the tubular body 6 engaged in the tubular element 2, as indicated by the arrow (g).

Such a translation of the tubular body 6 in the direction of the arrow (g) will clear said channels 12, respectively 13, thereby allowing hydraulic fluid to flow from said channels 12, 13 to the bleeding fitting 8, thereby reducing the hydraulic pressure at this region, and facilitating the assembling (respectively releasing) of the rod-like element 1 and the tubular element 2.

FIG. 4 schematically shows the withdrawing of the rod element 1 from the tubular element 2, so as to drive the tubular body 6 in the direction indicated in FIG. 4 by the arrows (i).

In this position too, the gasket 9 will clear said channels 12 and 13, thereby allowing hydraulic fluid to flow to the bleeding fitting as indicated by the arrow (h).

FIG. 5 shows the tubular body 6 by a perspective view.

In particular, are herein clearly shown the channels 12 and 13 allowing, depending on the position assumed by the tubular body 6 with respect to the gasket 9, hydraulic fluid to be drained toward the bleeding fitting 8.

FIG. 6, in turn, clearly shows the body 2, annular gasket 9, locking ring nut 11 and the recessed portions forming the channels 12 and 13.

Figure 7:
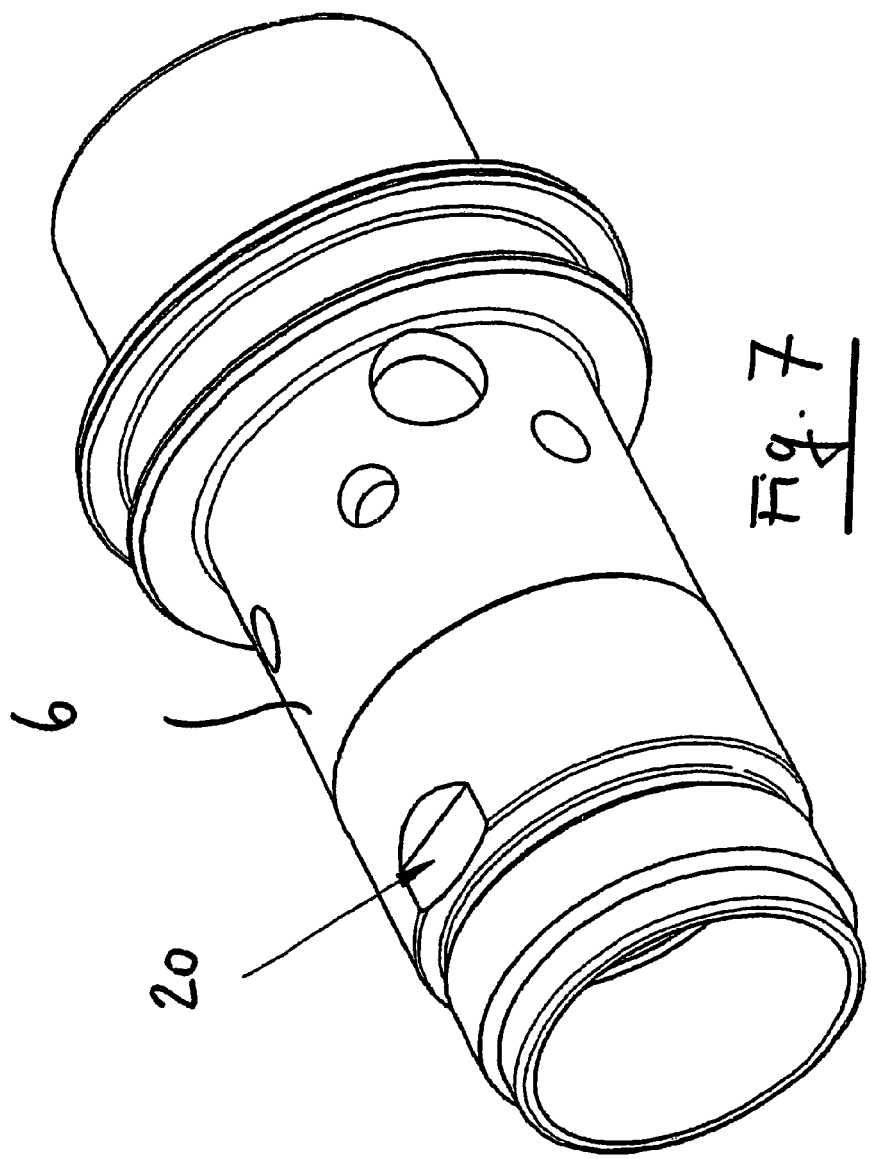
FIG. 7 shows, in perspective, the rear end portion of the tubular element.

FIG. 7 is a further perspective view showing the tubular element 6 having a single cavity 20, thereby providing a draining effect exclusively as the rod element 1 is assembled to the tubular element 2.

Figure 8:
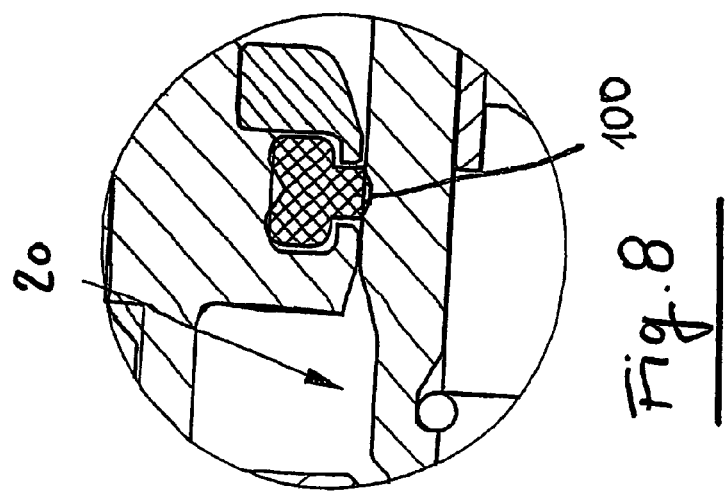
FIG. 8 shows, in cross section, the gasket in a sealing position thereof.

From the detail shown in FIG. 8, it should be apparent that said draining will occur only and exclusively during the coupling of the rod and tubular elements.

Figure 9:
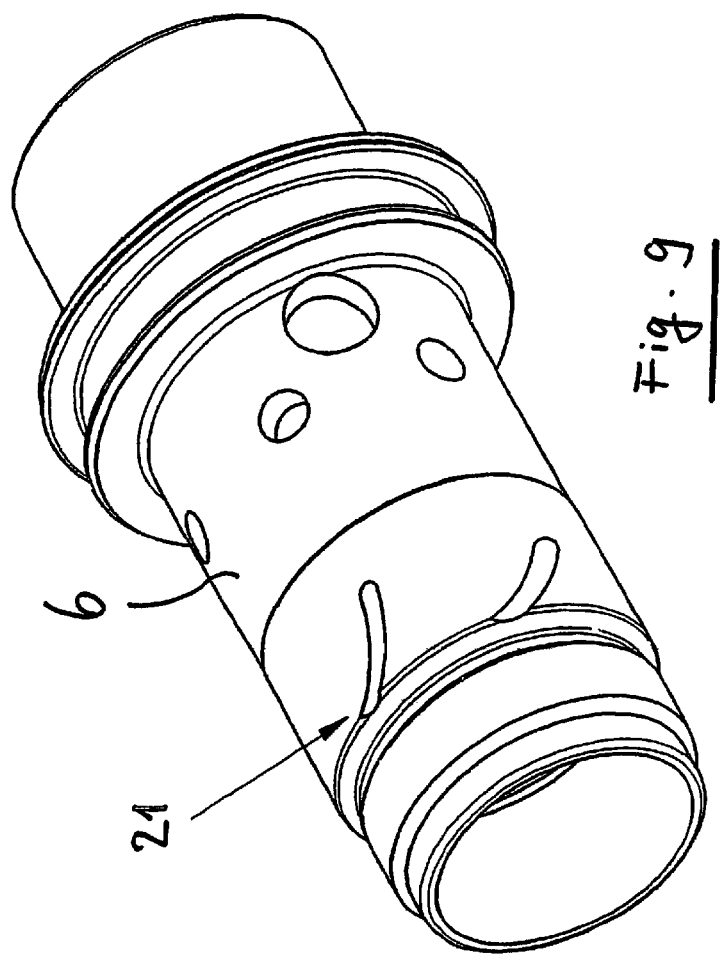
FIG. 9 shows a further embodiment of a tubular element having draining slots.
Figure 10:
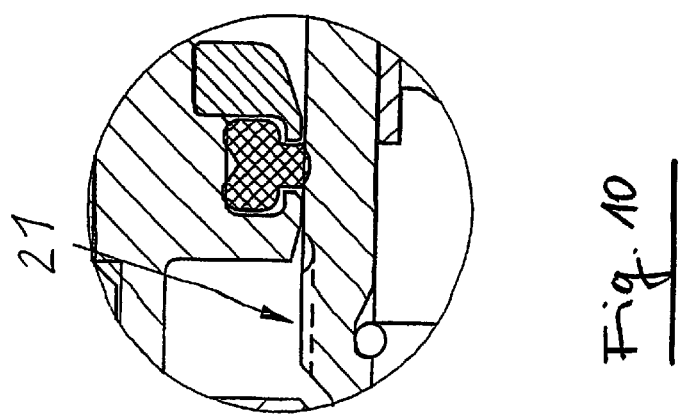
FIG. 10 shows, in cross section, the gasket in a sealing position thereof.

FIG. 9 shows that the tubular body 6 comprises spiral channels 21 distributed and circumferentially formed thereon.

Figure 11:
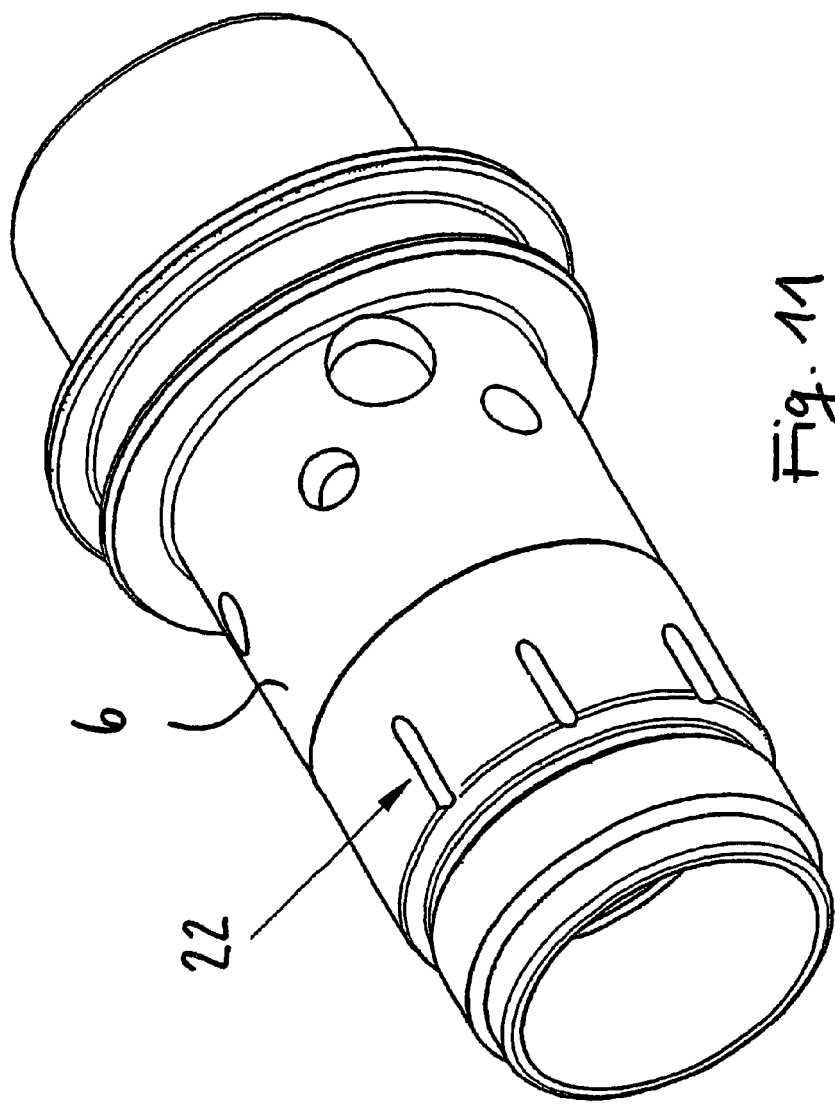
FIG. 11 shows, by a perspective view, the end portion of the tube, with a modified embodiment of the draining channels.
Figure 12:
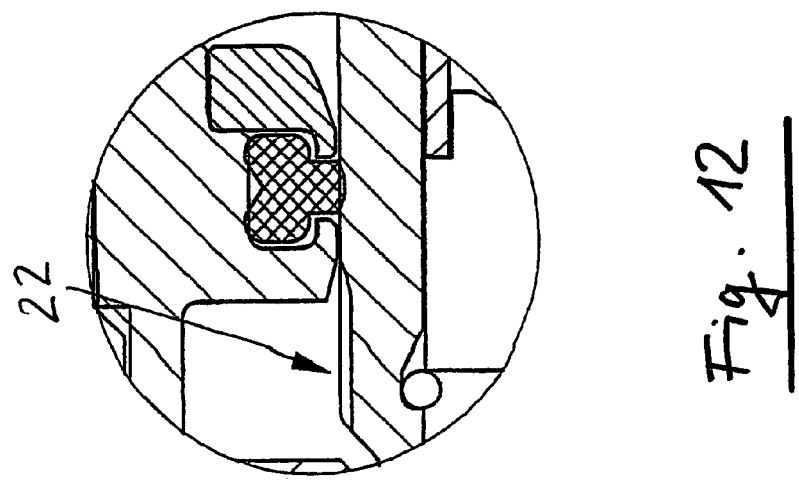
FIG. 12 shows, in cross section, the gasket in the sealing position thereof.

In the embodiment shown in FIG. 11, the tubular body 6 comprises channels 22 which are arranged parallel to the longitudinal axis of the tubular body 6 and extend circumferentially extend of said tubular body.

Figure 13:
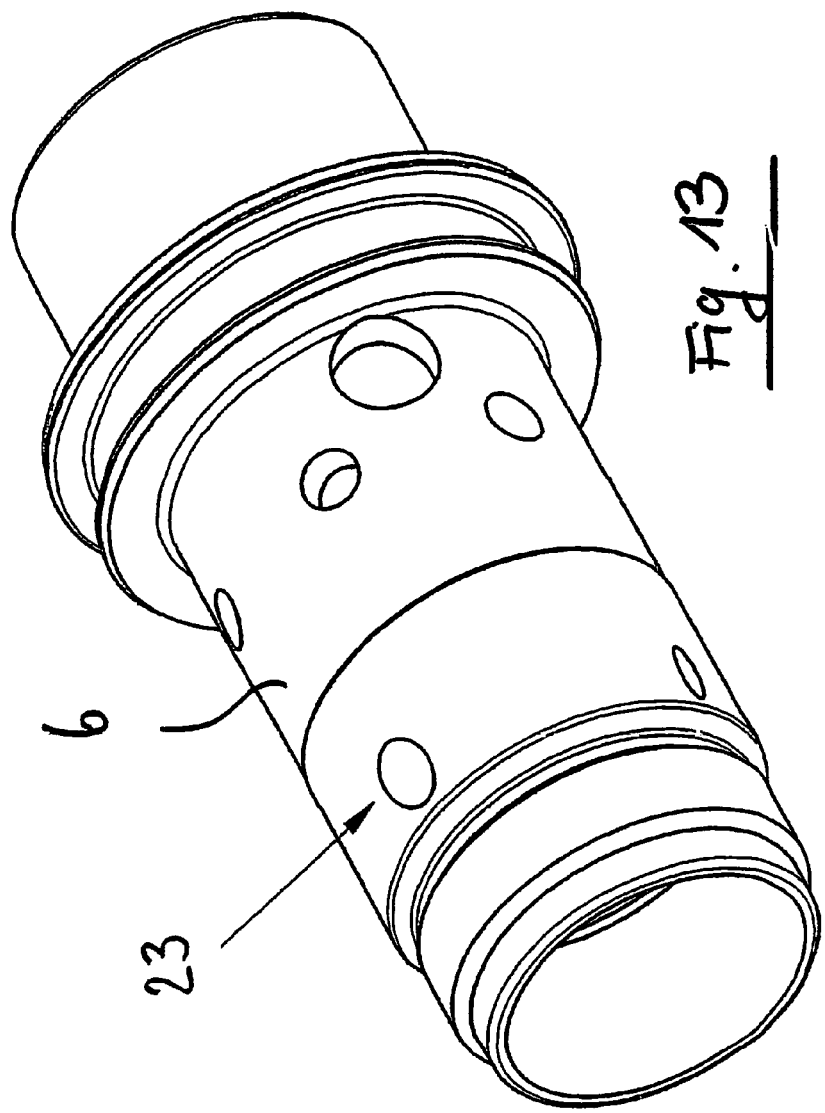
FIG. 13 shows, in perspective, a further embodiment of the end portion of the tubular element.
Figure 14:
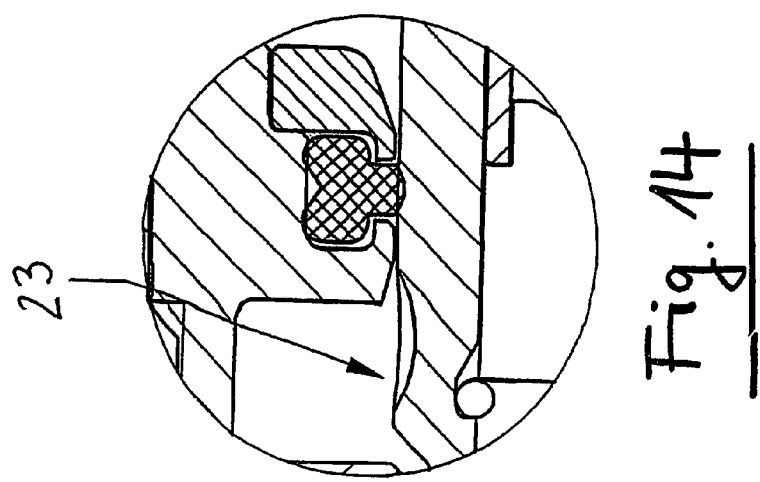
FIG. 14 shows, in cross section, the gasket in a tightly sealed position thereof.

FIG. 13 shows that a draining channel can also be formed by ball cup cavities 23, defined in the body 6 and distributed about the circumference thereof.

The quick coupling according to the present invention operates as follows:

As the free end portion of the annular gasket 9 tightly bears along the uninterrupted circumference of the tubular body 6, no hydraulic fluid will be bled or drained; said fluid, on the contrary, will exclusively flow in said the rod element 1 and tubular element 2, as indicated by the twin arrow (f) of FIG. 1.

Thus, by displacing the tubular body 6 in assembling, respectively disassembling, said elements 1 and 2, an opening will be formed at the region engaged by the gasket 9, whereas, as this sealed engagement is cleared, to allow hydraulic fluid to flow through the channel 12 respectively. 13, a bleeding zone will be deformed, thereby allowing said hydraulic fluid to outflow from said fitting 8, each time an assembling, respectively a disassembling operation of the quick coupling elements is performed.

What is claimed is:

1. A quick connect coupling, comprising:
    a) a pair of couplers coupled together upon relative movement of the couplers towards each other in one direction along an axis for conveying a fluid under pressure through the couplers, and being decoupled upon relative movement of the couplers from each other in an opposite direction along the axis;
    b) a bleed fitting for releasing the pressure of the fluid during said movement to facilitate coupling and decoupling of the couplers;
    c) an annular gasket stationarily mounted on one of the couplers; and
    d) a tubular body mounted for sliding movement along the axis within the other of the couplers, the tubular body having an outer wall formed with a sealing surface extending continuously and circumferentially around the axis, the outer wall also being formed with an outer channel axially adjacent the sealing surface, the sealing surface being slidably movable with the tubular body between a sealed position in which the sealing surface sealingly engages the gasket, and a bleed position in which the outer channel is spaced from the gasket to enable the fluid to bypass the gasket and pass to the bleed fitting for release of pressure in the fluid.

2. The coupling of claim 1, wherein the outer channel comprises a pair of grooves formed on the outer wall of the tubular body at opposite axial sides of the sealing surface.

3. The coupling of claim 1, wherein the outer channel comprises a plurality of spiral grooves spaced apart around the axis.

4. The coupling of claim 1, wherein the outer channel comprises a plurality of axial grooves spaced apart in mutual parallelism around the axis.

5. The coupling of claim 1, wherein the outer channel comprises a plurality of hemispherical cavities spaced apart around the axis.

6. The coupling of claim 1, and a locking ring for fixing the gasket on the one coupler.

* * * * *